United States Patent
Eker et al.

(10) Patent No.: US 8,522,047 B2
(45) Date of Patent: Aug. 27, 2013

(54) OBFUSCATING EXECUTION TRACES OF COMPUTER PROGRAM CODE

(75) Inventors: Johan Eker, Lund (SE); Björn Johansson, Bjärred (SE); Carl Von Platen, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 700 days.

(21) Appl. No.: 12/664,893

(22) PCT Filed: Jun. 25, 2008

(86) PCT No.: PCT/EP2008/058091
§ 371 (c)(1),
(2), (4) Date: Jun. 18, 2010

(87) PCT Pub. No.: WO2009/003894
PCT Pub. Date: Jan. 8, 2009

(65) Prior Publication Data
US 2010/0262839 A1    Oct. 14, 2010

Related U.S. Application Data

(60) Provisional application No. 60/947,695, filed on Jul. 3, 2007.

(30) Foreign Application Priority Data
Jun. 29, 2007    (EP) ..................................... 07388048

(51) Int. Cl.
*G06F 12/14*    (2006.01)
(52) U.S. Cl.
USPC .......................... 713/190; 717/106; 717/140

(58) Field of Classification Search
USPC .................................. 713/190; 717/106, 140
See application file for complete search history.

(56) References Cited

U.S. PATENT DOCUMENTS

| 6,668,325 B1 | 12/2003 | Collberg et al. |
| 6,950,867 B1 * | 9/2005 | Strohwig et al. ............. 709/224 |

(Continued)

FOREIGN PATENT DOCUMENTS

| WO | 99/01815 A | 1/1999 |
| WO | 01/69355 A | 9/2001 |

OTHER PUBLICATIONS

PCT International Search Report, mailed Sep. 3, 2008, in connection with International Application No. PCT/EP2008/058091.

(Continued)

*Primary Examiner* — Carl Colin
*Assistant Examiner* — Mohammad A Siddiqi
(74) *Attorney, Agent, or Firm* — Potomac Patent Group PLLC

(57) ABSTRACT

A computer-implemented method of generating tamper-protected computer program code. The method comprises obtaining a representation of the computer program code, the computer program being adapted to cause a data processing system to perform a plurality of computational tasks in a first order of execution, each computational task being represented in the representation of the computer program code by at least one program statement; obtaining a plurality of alternative orders of execution of the computational tasks; generating an executable representation of the program code adapted to cause a data processing system to select a randomized order of execution from the plurality of alternative orders of execution and to execute the computational tasks in the selected randomized order of execution.

17 Claims, 2 Drawing Sheets

(56) References Cited

U.S. PATENT DOCUMENTS

| | | | |
|---|---|---|---|
| 7,051,208 B2* | 5/2006 | Venkatesan et al. | 713/176 |
| 7,430,670 B1* | 9/2008 | Horning et al. | 713/190 |
| 7,610,623 B2* | 10/2009 | Sinha et al. | 726/23 |
| 7,644,440 B2* | 1/2010 | Sinha et al. | 726/23 |
| 2003/0046569 A1* | 3/2003 | Cuenod et al. | 713/193 |
| 2005/0076226 A1* | 4/2005 | Boivie et al. | 713/187 |

OTHER PUBLICATIONS

PCT International Preliminary Report on Patentability, mailed Jul. 29, 2009, in connection with International Application PCT/EP2008/058901.

Bacon, D.F. et al. "Compiler Transformations for High-Performance Computing" University of California, Computer Science Division, 1993, pp. 1-79, XP002459667, Berkeley, California, USA.

Toyofuku, T. et al. (Eds.) "Program Obfuscation Scheme Using Random Numbers to complicate Control Flow" EUC Workshops 2005. LNCS 3823, pp. 916-925, 2005.

Collberg, C. S. et al. "Watermarking, Tamper-proofing, and Obfuscation—Tools for Software protection" IEEE Transactions on Software Engineering, 28:Jun. 6, 2002, pp. 735-746.

Kennedy, K. et al. "Optimizing Compilers for Modern Architectures: A Dependence-based Approach" 2001, Morgan Kaufmann.

Wirth, N. "Algorithms + Data Structures = Programs" Prentice-Hall, Englewood Cliffs, New Jersey, 1975, pp. 182-189.

Knuth, D.E. The Art of Computer Programming, vol. 2: Seminumerical Algorithms, Third Edition. Addison-Wesley, 1997, ISBN 0-201-89684-2, Section 3.2.1: The Linear Congruential Method, pp. 10-26.

Matsumoto, M. et al. "Mersenne twister: a 623-dimensionally equidistributed uniform pseudo-random number generator", ACM Trans. Model. Comput. Simul., vol. 8, No. 1, 1998, pp. 3-30, ACM Press, New York, NY, USA.

Aho, A.V. et al. "Compilers-Principles, Techniques and Tools" Adison-Wesley, Reading, USA, 1986, pp. 584-603.

* cited by examiner

OBFUSCATING EXECUTION TRACES OF COMPUTER PROGRAM CODE

CROSS-REFERENCE TO RELATED APPLICATIONS

This application claims the benefit of U.S. Provisional Application No. 60/947,695, filed Jul. 3, 2007, which is hereby incorporated herein by reference in its entirety. This application also claims priority under 35 U.S.C. §119 to European Patent Application No. 07388048.6, filed Jun. 29, 2007, which is hereby incorporated herein by reference in its entirety.

TECHNICAL FIELD

The invention relates to tamper protection of computer program code, in particular by obfuscating the execution trace of a computer program code.

BACKGROUND

Software tampering is an attack which has the purpose of altering the way a piece of software operates in such a way that it brings illegitimate benefits to the attacker. The objectives of tampering could be to circumvent/disable copy protection or security mechanisms, to extract secret or copyrighted material, or to introduce malicious code such as computer viruses.

In many situations, the illegitimate benefits may involve substantial financial disadvantages for software producers. Consequently, both attackers and software vendors may be expected to make significant efforts to break and improve protection mechanisms against software tampering, respectively. In the context of mobile phones, protection of the SIM-lock and other sensitive software components, e.g. Digital Rights Management (DRM), are of particular interest. Furthermore, tamper protection of other software entities and/or for other purposes and/or in connection with other uses may also be beneficial.

In order to modify a software component, an attacker typically has to acquire at least a partial understanding of how the software component functions. Software tampering may thus be delayed if not prevented by making reverse engineering more difficult. Transformations, which make the software harder to analyze are useful to this end; such transformations are generally referred to as obfuscation.

Techniques for reverse engineering software may roughly be divided in two groups of techniques: Static (or "offline") code analysis and dynamic (or "live") code analysis. When performing dynamic analysis, the software is observed as it is executing. In contrast, static analysis is usually limited to an examination/analysis of some representation of the program code, without actually executing it. One technique employed in dynamic analysis is the comparison of execution traces.

An execution trace of a program typically includes the sequence of memory addresses from which the executable instructions are read during execution of a program. Execution traces may thus be collected by running the program, e.g. by using specific hardware support (so-called trace buffers) or by a software-based recording of the addresses. Using an execution trace and the executable code of the program, the actual sequence of executed instructions can thus be recreated.

By providing two sets of stimuli and comparing the differences in the resulting execution traces, an attacker can gain knowledge of the software component. In particular, comparison of execution traces may identify critical decision points of the program. In the context of the SIM-lock and DRM-solutions of mobile devices, tests for correct signatures or checksums are examples of critical decision points. For example, an attacker may compare the execution traces of the software run by two different mobile devices, e.g. an operator-locked device and a device that is not operator-locked, so as to obtain information about which parts of the program are relevant for the SIM-lock functionality.

Previous attempts to make reverse engineering by dynamic analysis more difficult include attempts to limit the opportunities for an attacker to observe the program as it is executing. However, such counter-measures have generally been specific to a particular platform and/or a specific reverse-engineering tool, such as a specific debugger.

One example of such counter-measures includes encrypting the executable code and the use of specific hardware that combines decryption and execution of the code. Even though properly implemented hardware-based decryption techniques can offer good protection, this protection is achieved at the price of additional, specific hardware.

Another approach, known as anti-debugger techniques, has the purpose of complicating the process of observing the program execution in a particular debugger. On some platforms, the executing code can query the operating systems for a possible debugger that is attached to the process and e.g. terminate if this is the case. Another option is to interfere with the techniques used by the debugger, for instance by tampering with the setting of break points. However, anti-debugger techniques are specific to a particular debugger and do not provide a general purpose tamper protection technique. Furthermore, instruction-set simulators and hardware-supported debuggers are commonly used when debugging embedded systems, thus reducing the practical usefulness of anti-debugger techniques. Furthermore, execution traces may still be collected using trace buffers that are entirely implemented in hardware.

Obfuscation is a technique used to complicate code. Obfuscation makes code harder to understand when it is de-compiled, but it typically has no effect on the functionality of the code. Obfuscation of programs can be used to protect programs by making them harder to reverse-engineer.

A number of obfuscation techniques have been proposed. The article "Program Obfuscation Scheme Using Random Numbers to complicate Control Flow" by Tatsuya Toyofuku et al, in T Enokido et al. (Eds.): EUC Workshops 2005. LNCS 3823, pp. 916-925, 2005, proposes one such obfuscation scheme. However, this method was reported to be vulnerable to dynamic analysis.

WO 01/69355 discloses a method for embedding a watermark into a computer-program by inserting additional routines in the program along with a number of randomly established additional control flows, thus resulting in a particular, i.e. the watermarked, version of the program having a corresponding control flow.

U.S. Pat. No. 6,668,325 and the article "Watermarking, Tamper-proofing, and Obfuscation—Tools for Software protection" by Christian S. Collberg and Clark Thomborson, IEEE Transactions on Software engineering, 28:6 (June 2002), describe a number of obfuscating transformations. On such transformation introduces redundant if-statements. The condition of the if-statement is a so-called opaque predicate which has some property that is known when the program is obfuscated but difficult to identify by static analysis of the code. Opaque predicates that always evaluate to e.g. TRUE may be used in such an if-statement. Consequently, at obfuscation time it is known that only one of the branches of the if-statement will be executed. Thus, during obfuscation the code to be executed may be inserted into that branch, while the other branch that is never executed may include some arbitrary "dummy" code. The above prior art document further describes the use of opaque predicates whose outcome may be either TRUE or FALSE for the selection of one of two alternative instances of a given computational task. However, even though this technique makes the static analysis of the code harder, it does not efficiently increase the difficulty of a dynamic analysis attempting to identify critical decision points.

One particular transformation disclosed in U.S. Pat. No. 6,668,325 is referred to as an ordering transformation and involves a randomized placement of source code items (terms within expressions, statements within basic blocks, etc.), so as to prevent reverse-engineering of the code. The reordering of the source code items is performed based on a dependency analysis which is performed to determine which re-orderings are technically valid. Hence, this prior art transformation process generates one of the technical possible re-orderings of the source code to be implemented. Consequently the resulting executable code will represent this generated ordering.

However, it remains a general problem to provide efficient methods of obfuscating program code so as to make it more difficult to gain useful information from an analysis of the execution trace of the program, e.g. in order to identify interesting decision points and/or other critical points.

SUMMARY

The above and other problems are solved by a computer-implemented method of generating tamper-protected computer program code, the method comprising:

obtaining a representation of the computer program code, the computer program code being adapted to cause a data processing system to perform a plurality of computational tasks in a first order of execution, each computational task being represented in the representation of the computer program code by at least one program statement;

obtaining a plurality of alternative orders of execution of the computational tasks;

generating an executable representation of the program code adapted to cause a data processing system to select a randomized order of execution from the plurality of alternative orders of execution and to execute the computational tasks in the selected randomized order of execution.

Embodiments of the method described herein provide a transformation of the program code, e.g. source code, of a software component into modified code that results, when the code is executed, in an effectively obfuscated execution trace. In particular, the transformed code causes the computer that executes the resulting code to select an ordering among a plurality of orderings, i.e. one of a plurality of possible orderings is selected at run-time rather than being determined a priori as one particular ordering during the transformation and code generation process. Consequently, as the ordering may vary from execution to execution useful information is difficult if not impossible to obtain when executing the code with different inputs, thereby preventing critical decisions points from being easily detectable as differences in the execution traces when executing the software using different inputs.

Hence, embodiments of the method described herein transform the input representation of a software component in such a manner that the effort required to compare execution traces is increased. The relevant differences are hidden in a large volume of seemingly random differences. Therefore, the initial phase of a tampering attack involving comparison of execution traces with the purpose of gaining knowledge of a software component is made considerably more difficult. Thus the method described herein provides an efficient protection of the program code against an attack based on dynamic analysis.

The representation of the program code may include any suitable input representation in which different computational tasks may be identified. Typically, the representation of the program code includes a representation of the computational tasks that may serve as an input to one or more code generation or code interpretation tools, such as a compiler, a linker, an interpreter, and/or the like. Hence, the representation of the program code may be executed directly by a data processing system, e.g. by means of a code interpreter, or it may be translated into an executable form, e.g. by means of a compiler and/or linker. Examples of suitable input representations include source code of a suitable programming language, object code, and/or the like.

The transformation according to the method described herein may be viewed as an obfuscation of the temporal order of execution of the computational tasks rather than a spatial reordering of source code constructs used by prior art obfuscation techniques. Consequently, embodiments of the method described herein provide a varying temporal order of execution of the same (or at least substantially the same, since the random seed may vary from installation to installation) code image for several or even all installations.

The term "program statement" as used herein is intended to include a unit of structuring a programming language, in particular a minimal unit of such structuring. Examples of kinds of program statements include definitions, declarations, assignments, conditional statements, loops, and function/procedure calls. A conditional program statement general causes the program to selectively execute one of a set of alternative program branches. Each branch may include one or more program statements. Examples of conditional program statements include if-statements, case-statements or the like.

It will be appreciated that the first order of execution in which the computational tasks are executed may depend on the input representation and/or on one or more processing steps during the generation of the executable program code instructions, e.g. on the compilation step. For example, the input representation may include a sequence of program statements, and this sequence may determine a sequential order of execution. The first order of execution may also depend on program inputs received during execution of the program and/or on the outcome of other tasks, e.g. in situations of conditional program statements. The order of execution may be a sequential order of computational tasks. On the other hand, in some embodiments, some computational tasks may be executed concurrently or even synchronised with each other, e.g. as two or more threads of a multithread program execution. It will be appreciated that the order of execution of at least some of the computational tasks may be changed without changing the overall behaviour of the program. However, it will also be appreciated that the relative order of some tasks may not be interchanged without changing the program behaviour.

The term "computational task" as used herein is intended to include a collection of computational steps representable by one or more computer-executable instructions. Jointly, the computational tasks of a software component constitute all the computations/operations performed by the software component. For the purposes of the present description, each computational task may be fine-grained, e.g. a single program statement of a source code language, or coarse-grained, e.g. a function/procedure/subroutine comprising several statements, or even several functions/procedures/subroutines.

Obtaining the plurality of alternative orders of execution may include processing an input representation of the program code by a program analysis tool so as to identify a plurality of computational tasks and their mutual interdependencies. For example, this process may be performed by an automated program analysis tool or it may at least in part be performed based on user-input. It will be appreciated that there are source languages, e.g. functional languages and data-flow languages, that are particularly suitable for an automated or semi-automated identification of computational tasks and alternative orders of execution, since the opportunities for reordering are particularly easy to identify. In some embodiments, the analysis tool may provide a suitable user interface allowing a user to identify computational tasks and possible alternative orders of execution. It will be appreciated that the set of alternative orders of execution may include the first order of execution.

In some embodiments, each of the alternative orders of execution is adapted to cause the data processing system to produce the same program output as the first order of execution, when said program code is executed by said data processing system. Hence, the transformation of the program code is semantic-preserving, i.e. has no influence on the program output created by the computer program. The program statements that should not be affected directly or indirectly by a semantics-preserving transformation are also referred to as providing the critical effects of a program. All program statements that interact with a program's environment may be regarded as contributing to the program output.

The term "program output" as used herein is intended to include any observable behaviour during execution of the program, e.g. any program behaviour that is specifiable by the programming language used and that is observable/noticeable by a user, by another computer program, by another device, or the like. Examples of program output include the output of numeric values, text output, binary output, output signals, visual, e.g. graphical, output, audible output, etc. that may be output via any suitable output device such as a computer screen, printer, storage medium, communications interface, etc., via a data interface, or the like.

Consequently, an efficient method is provided that ensures that the obfuscated code has the same effect/produces the same program output as the input code.

In one embodiment, the method comprises:
receiving an input representation indicative of a plurality of program statements in a predetermined sequential order;
grouping the program statements to obtain the plurality of computational tasks
identifying the plurality of alternative orders of execution.

The alternative orders of execution may be represented by any suitable data structure for representing a dependence relation which specifies the constraints on execution order that are required to guarantee semantic equivalence. The dependence relations may be determined by any suitable method for dependence analysis.

The constraints on the order of execution may efficiently be represented by a data structure indicative of a precedence graph comprising nodes indicative of computational tasks and edges indicative of an order of precedence of computational tasks. The precedence graph may be a directed graph, e.g. a directed acyclic graph. Hence, the precedence graph is an efficient representation of the precedence constraints under which valid orders of execution may be selected.

In some embodiments, generating an executable representation of the program code further comprises including computer-executable instructions in the executable representation of the program code adapted to cause a data processing system to perform the following tasks, when the program code is executed by the data processing system:
 a) performing an initial one of the computational tasks;
 b) selecting a subsequent computational task from a set of alternative successors of the performed computational task in a precedence graph indicative of a set of precedence constraints imposed on the order of execution of the computational tasks;
 c) performing the selected computational task;
 d) repeating steps b) and c) until all computational tasks have been performed.

In some embodiments, generating an executable representation of the program code further comprises including computer-executable instructions in the executable representation of the program code adapted to cause a data processing system to maintain an execution state, the execution state being defined by at least one of the subset of computational tasks that remain to be executed and the subset of computational tasks that remain to be executed and whose predecessors in the precedence graph have all been executed. Hence, an efficient mechanism is provided for the program code to cause the data processing system to execute the tasks in a randomised order under the given precedence constraints.

The randomized order of execution may be determined from a random sequence of data items. The randomised sequence of data items may be determined by a pseudo-random number generator, i.e. an algorithm that uses arithmetic to generate a sequence of numbers that approximate the properties of random numbers, known as such in the art, or by any other suitable mechanism known in the art for generating a sequence of data items that appears random to an observer.

For example, when the randomized sequence of data items is determined by a function for generating a randomized sequence of data items such as a pseudo-random number generator, the execution state may further include a seed data item for initialising said function for generating the randomized sequence of data items.

Alternatively, the randomised order may be generated by a hardware random number generator, i.e. a device, apparatus, or circuitry for generating random numbers from a suitable physical process, e.g. based on a suitable microscopic mechanism such as thermal noise, the photoelectric effect or other quantum phenomenon.

In some embodiments, the method comprises inserting executable instructions into each of the computational tasks for performing the step of selecting the subsequent computational task. Consequently, by integrating the control logic that orders the computational tasks and updates the program state into the individual tasks, this functionality is distributed rather than provided as a centralised function, thereby making it more difficult for an adversary to reverse engineer the part of the program code that is responsible for selecting the order of execution and for invoking the tasks in the selected order.

For example, each task may be implemented as a function/procedure/subroutine or other suitable structural unit of a programming language, where each function/procedure/subroutine selects and invokes a successor function/procedure/subroutine under the given precedence constraints. In alternative embodiments, the method includes inserting at least one separate function/procedure/subroutine or other structural entity of a programming language into the program code adapted to perform the ordering of the computational tasks when the program code is executed by a data processing system. Hence, in such alternative embodiments, the ordering of the tasks is performed by a separate function which is auxiliary to the actual tasks of the software component.

In some embodiments, the method further comprises generating executable instructions of multiple instances of the computational task; and selecting the computational task includes selecting one of the multiple instances of the computational tasks. In this way, not only the order of execution, but also the addresses from which the code is executed vary between executions of the software component, thus further complicating a comparison of execution traces. The method may further comprise performing one or more obfuscating transformations on at least one of the multiple instances. Consequently, additional diversity is achieved by applying different semantics-preserving transformations to the various instances. As a result, not only the addresses vary, but also the instructions fetched from these addresses, which further complicates comparison of execution traces.

In some embodiments, each execution of a given installed software component may result in an execution trace, which is—at least with a high probability—unique, e.g. by executing the computational tasks in respective randomized sequences initiated by different seed data items or generated by a hardware random number generator.

In alternative embodiments, generating an executable representation of the program code comprises generating an executable representation of the program code including program code for causing a data processing system to select the same randomized order of execution from the plurality of alternative orders of execution during each execution of the generated executable representation of the program code. Hence, the execution trace of each installation of a software component may be caused to be the same for each execution of the software component but to vary from installation to installation. In particular, the execution trace may be caused to be unique for a particular installation or group of installations.

For example, the method may comprise generating respective executable representations of the program code for different installations of the program code, each executable representation of the program code including a respective seed data item indicative of the corresponding installation. In particular if the number of possible execution orders is relatively limited, generating a fixed trace which is unique for each installation of the software component has the advantage that it prevents an analysis of the nature of the variations by executing the same installation a large number of times. Instead, a large number of installations and, thus, a considerably larger effort would be required for an analysis.

The term installation of a software component as used herein refers to an individual copy of the executable representation of the software that is installed or at least installable on a data processing system, e.g. in the form of one or more executable files, an installation package, or the like. For example, an installation may be embodied as a computer-readable medium such as a CD ROM having stored thereon a copy of the software component, or a downloadable file stored on a server computer.

In some embodiments, the method comprises generating a plurality of executable representations of the program code, each including program code for causing a data processing system to select a different randomized order of execution. Accordingly, each installed software component may be generated so as to have a unique execution trace. In this case, repeated execution of the same installation results in identical execution traces, which differ from the trace of any other installation. Specifically, it will be appreciated that this may be utilised to make the execution traces of an operator-locked mobile phone and an unlocked one dissimilar, while repeated executions of the two installations do not provide additional knowledge of the nature of the variations in the execution traces.

It is noted that the features of the methods described above and in the following may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

For example, the program code means may be loaded in a memory, such as a RAM (Random Access Memory), from a storage medium or from another computer via a computer network. Alternatively, the described features may be implemented by hardwired circuitry instead of software or in combination with software.

The present invention relates to different aspects including the method described above and in the following, corresponding devices, and computer programs, each yielding one or more of the benefits and advantages described in connection with the above-mentioned method, and each having one or more embodiments corresponding to the embodiments described in connection with the above-mentioned method.

In particular, according to one aspect, a data processing system is suitably configured to perform the steps of the method described above and in the following.

According to another aspect, a computer program product comprises computer-executable instructions adapted to cause, when executed on a data processing system, the data processing system to perform the method described above and in the following. In some embodiments, the computer program product is embodied as a computer-readable medium having stored thereon the computer-executable instructions. For example, the computer-readable medium may be a compact disc (CD), an optical disc, a diskette, a magnetic storage medium, a memory stick, or the like, that has stored thereon the computer-executable instructions. For example, the computer-readable medium may have stored thereon a software application for tamper-protecting program code. In other embodiments, the computer program product is embodied as a data signal, e.g. a suitably modulated carrier signal. For example, the computer-executable instructions may be provided for download from a server computer via a computer network.

In some embodiments, the computer program product may be implemented as a source-code to source-code transformer, i.e. a computer program that receives one or more input source code modules and generates one or more output source code modules that may be compiled by a conventional compiler. In some embodiments, the computer program product may be integrated into a compiler, i.e. it may be embodied as a software compiler comprising functionality adapted to cause the data processing system to perform the method described above and in the following as one of a number of compilation passes performed by the compiler. Hence, an integrated software tool for tamper-protection and compilation is provided. Furthermore, since embodiments of the tamper protection described herein involves some of the same code analysis techniques for analysing source code as conventional compilers use, the corresponding software functionality may be reused, thereby providing an efficient software implementation.

For the purpose of the present description, the terms storage means/device and computer-readable medium are intended to comprise any suitable storage medium, device or circuit, e.g. a read-only-memory (ROM), a random access memory (RAM), a flash memory, an Erasable Programmable Read-Only Memory (EPROM), volatile or non-volatile memory, an optical storage device, a magnetic storage device, a diskette, a CD, a hard disk, or the like.

BRIEF DESCRIPTION OF THE DRAWINGS

The above and other aspects will be apparent and elucidated from the embodiments described in the following with reference to the drawings in which.

DETAILED DESCRIPTION

Figure 1:
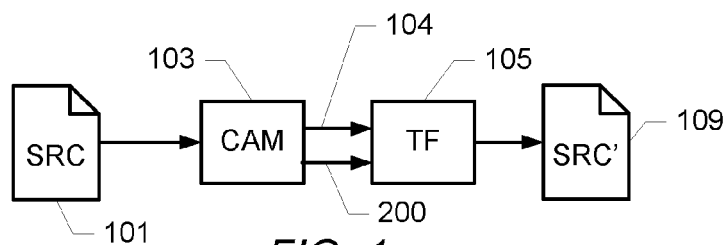
FIG. 1 shows a schematic block diagram of a process for tamper protecting program code.

FIG. 1 shows a schematic block diagram of a process for tamper protecting program code.

The process receives a source code 101. The source code 101 is typically in the form in which a computer program has been written by a programmer, typically in a formal programming language such as C, C++, Java, or the like. The source code can be automatically compiled by a compiler into object code or machine code or executed by an interpreter. The source code 101 may be represented as one or more text documents or as any other suitable digital representation. Even though source code written in any suitable programming language may be used as an input, it will be appreciated that some source code languages are particularly suitable for identifying opportunities for reordering, e.g. functional languages and data-flow languages.

Functional languages generally follow a programming paradigm that treats computation as the evaluation of mathematical functions and avoids state and mutable data. It emphasizes the application of functions, in contrast with the imperative programming style that emphasizes changes in state. Examples of functional languages include APL, Erlang, Haskell, Lisp, ML, and Scheme.

Dataflow languages are programming languages that implement dataflow principles and architecture, and model a program, conceptually if not physically, as a directed graph of the data flowing between operations. Data flow languages share some features of functional languages and were generally developed in order to bring some functional concepts to a language more suitable for numeric processing. In data flow languages, operations are typically regarded as "black boxes" with inputs and outputs, all of which are always explicitly defined. Examples of data flow languages include Lustre, Ptolemy/CAL, LabView and Simulink.

Alternatively, the tamper-protection process may receive a different type of input representation in which computational tasks and their interdependencies can be identified, e.g. object code.

The source code 101 is fed into a code analysis module 103. The code analysis module parses the source code and identifies a set of computational tasks and their mutual interdependencies, in particular the precedence constraints imposed on the order of execution of the computational tasks. The code analysis module 103 represents the precedence constraints as a precedence graph, an example of which is shown in FIG. 2

Figure 2:
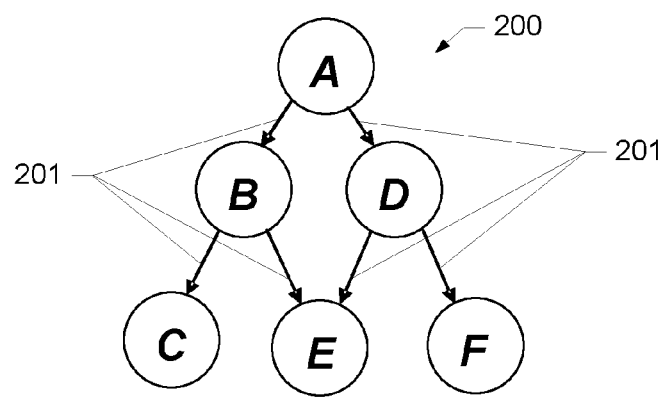
FIG. 2 schematically illustrates an example of a precedence graph.

FIG. 2 illustrates an example of a precedence graph. A precedence graph includes nodes representing respective computational tasks and edges representing precedence constraints between the tasks. In the example of FIG. 2, the precedence graph generally designated 200 is a directed acyclic graph that includes nodes labelled A through F, each node representing a corresponding computational task. It will be appreciated that a precedence graph may include any number of nodes corresponding to the number of computational tasks identified in a given software component. The nodes A-F are connected by unidirectional edges 201, where each edge connects two nodes and identifies a precedence constraint between the said two nodes, i.e. that one of the computational tasks has to be executed before the other computational task may be executed. Each edge is thus directed from a predecessor node to a valid successor node. For example, in the example shown in FIG. 2, execution of task E requires that the predecessor tasks B and D have already been executed. Hence, the following orders of execution of the tasks A-F are examples of execution traces that fulfil the precedence constraints imposed by precedence graph 200:

Execution Trace #1:
    A, B, C, D, E, F
Execution Trace #2:
    A, D, B, E, C, F
Execution Trace #3:
    A, D, F, B, E, C For example, the code analysis module 103 may provide a user-interface allowing a user to identify the computational tasks and their valid orderings. Alternatively or additionally (e.g. based on the user-defined tasks as a starting point), the code analysis module 103 may automatically or at least semi-automatically identify the valid ordering of the tasks (i.e. the precedence graph), e.g. by generating an initial division into tasks and by generating a corresponding precedence graph, and optionally by providing a user-interface allowing a user to modify the selection of computational tasks and/or the valid orderings.

The code analysis module 103 may use any suitable technique for parsing a source code known in the art, for example a subset of the techniques used by conventional compilers when parsing source code as to identify the structural components of the corresponding programming language, such as functions, conditions, loops, etc. The code analysis module may process the entire input code or just a subset thereof.

In particular, the code analysis module 103 may employ any suitable technique for dependence analysis known in the art of program analysis and resulting in a precedence graph or another suitable representation of the identified dependence relations that specify the constraints on execution order that may be required to guarantee semantic equivalence.

Examples of such techniques are e.g. described in "Optimizing Compilers for Modern Architectures: A Dependence-based Approach" by Ken Kennedy & Randy Allen, (2001), Morgan Kaufmann.

In general, dependence analysis produces execution-order constraints between statements and/or instructions. For example, a statement S2 may be said to depend on a statement S1 if S1 must be executed before S2.

The lack of state in functional languages significantly facilitates dependence analysis. In a pure functional program, there are no side effects, i.e. functions only depend on their arguments. For example, assuming that A through F are pure functions, the following program results in the precedence graph shown in FIG. 2:

$$a=A(x)$$

$$b=B(a)$$

$$c=C(b)$$

$$d=D(a)$$

$$e=E(b,d)$$

$$f=F(d)$$

As mentioned above, the dependence analysis can be performed on more or less fine-grained tasks. Some of these methods may be performed fully automated, while others may require some degree of user input.

For example, for imperative languages, such as C, C++ and Java, there are several well-known methods of dependence analysis and fine-grain precedence graphs, e.g. for use in connection with instruction scheduling, and the vectorization or parallelization of loops.

Further examples of dependence analysis techniques include techniques for analysing the side-effects of functions. Identifying side-effect free ("pure") functions may be regarded as a special case of this type of analysis.

The code analysis module 103 forwards information 104 about the identified computational tasks (e.g. in the form of pointers to their respective locations in the code) and the generated precedence graph 200 to a code transformation module 105.

The transformation module 105 transforms the input code so as to produce transformed source code 109. In particular, the transformation module 105 inserts program code into the source code that implements the selection and invocation process of the computational tasks under the precedence constraints defined by the precedence graph 200. The transformation module may further modify the source code corresponding to the respective tasks, e.g. by inserting code for returning to a separate task selection and dispatch function or by inserting code for selecting and invoking a successor task. Furthermore, the transformation module may translate the code corresponding to the respective computational tasks into predetermined structural entities of the corresponding programming language. For example, the translation module may generate a respective function/procedure/subroutine for each of the computational tasks.

The transformed source code 109 may subsequently be further processed, e.g. compiled, linked, compressed, encoded, and/or the like.

Figure 3:
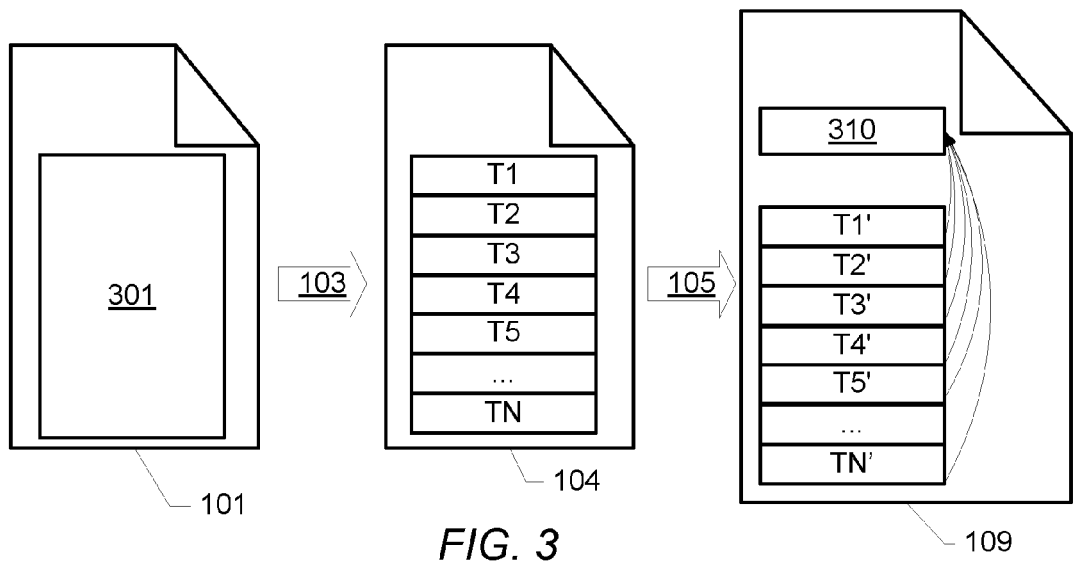
FIG. 3 schematically illustrates an example of a source code transformation resulting in a transformed source code including a central task selection and dispatch function.

The code for ordering of the tasks may be inserted as a separate selection and dispatch function/procedure/subroutine, which is auxiliary to the actual tasks of the software component, as illustrated in FIG. 3.

FIG. 3 shows an example of an input source code module 101, a corresponding source code module 104 in which a plurality of computational tasks, labelled T1, T2, . . . , TN have been identified e.g. by the code analysis module 103, and a transformed source code module 109, e.g. as generated by the transformation module 105. The input source code module includes source code 301 adapted to cause a data processing system to perform a plurality of computational tasks. The transformed source code module includes transformed computational tasks T1', T2', . . . , TN', and a selection and dispatch function 310.

The inserted selection and dispatch function 310 may simply order the computational tasks by selecting them one by one, while adhering to the precedence constraints defined by the precedence graph. For example, the precedence graph may be represented by a suitably initialised data structure or the constraints may be coded directly in the inserted function 310. The transformed computational tasks are modified such that they upon completion return the program control to the selection and dispatch function 310.

The selection and dispatch function 310 may maintain a state of the executed program in order to keep track of precedence while selecting the tasks. In one embodiment, the selection and dispatch function uses a function, $\kappa$, to select the "next" task t, given a specific state of the execution of the program.

Furthermore, the selection and dispatch function uses a function, $\delta_t$, to update the state after selecting the task t. If $s_0$ denotes the initial state and N denotes the total number of tasks, the tasks may be ordered as illustrated by the following pseudo-code illustrating an example of a selection and dispatch function:

```
s := s_0
for i=1,2,...,N do
    t := κ(s)
    execute task t
    s := δ_t(s)
od
```

Hence, initially, the current state variable s is initialized to the initial program state $s_0$. Subsequently, a loop is executed N times, where in each iteration the next task t is selected by executing the function $\kappa(s)$. Then the selected task t is executed, and the program state is updated by executing the function $\delta_t$.

It will be appreciated that the set of execution states and the functions $\kappa$ and $\delta_t$ may be defined in a variety of ways. In one embodiment, their definition is derived from a standard approach to topologic sorting (see e.g. Niklaus Wirth, "Algorithms+Data Structures=Programs," pp 182-189, Prentice-Hall, Englewood Cliffs, N.J., 1975) suitably modified so as to provide a randomised selection of the tasks. To this end it is useful to note that all valid execution orders correspond to a topologic ordering of a corresponding precedence graph.

In one embodiment, the execution state is represented by the tuple (T,Z,r), where T denotes the set of tasks (i.e. nodes in the precedence graph) that remain to be ordered, Z denotes the set of remaining tasks with no predecessors left to order, and r denotes a (pseudo-) random seed. Z is thus the subset of T which contains the candidate tasks for execution in the next step of the iterative process. The function $\kappa$ selects one of the candidates in Z using the (pseudo-) random seed, r. The function $\delta_t$ updates the state, e.g. in the following manner:

$$\delta_t(T,Z,r)=(T',Z',r') \text{ where}$$

T'=T\{t},
Z'=(Z\{t})∪{u|u∈succ(t), p∉T' for all p∈pred(u)}
r'=prng(r).

The task t is removed from the set of tasks T resulting in the updated set, T', of tasks that remain to be scheduled. The task t is also removed from the set Z of candidates for execution in the next step of the algorithm, resulting in the updated set Z'. Added to the set of candidates are the successors u of t in the precedence graph, all of whose predecessors p have already been executed, i.e. are not included in T'. The (pseudo-)random seed, r, is updated by a function prng which implements a suitable algorithm for pseudo-random number generation, e.g. the linear congruential method (see e.g. D. E. Knuth. The Art of Computer Programming, Volume 2: Seminumerical Algorithms, Third Edition. Addison-Wesley, 1997, ISBN 0-201-89684-2, Section 3.2.1: The Linear Congruential Method, pp. 10-26), the Mersenne Twister algorithm (Makoto Matsumoto and Takuji Nishimura: "Mersenne twister: a 623-dimensionally equidistributed uniform pseudo-random number generator", ACM Trans. Model. Comput. Simul., vol. 8, nr. 1, 1998, pages 3-30, ACM Press, New York, N.Y., USA) or any other suitable method. Alternatively, random number generation hardware or any other suitable way of generating a (pseudo-)random sequence of numbers of other data items may be used.

It is further noted that in the above embodiment both subsets T and Z are maintained, thus providing an efficient implementation. It will be appreciated, however, that in an alternative embodiment only one of the subsets may be maintained, since T may be derived from Z and vice versa. Furthermore, it will be appreciated that other representations may be used, for example, the set of tasks that have been executed and its subset of tasks with no successors in the set of executed tasks.

Figure 4:
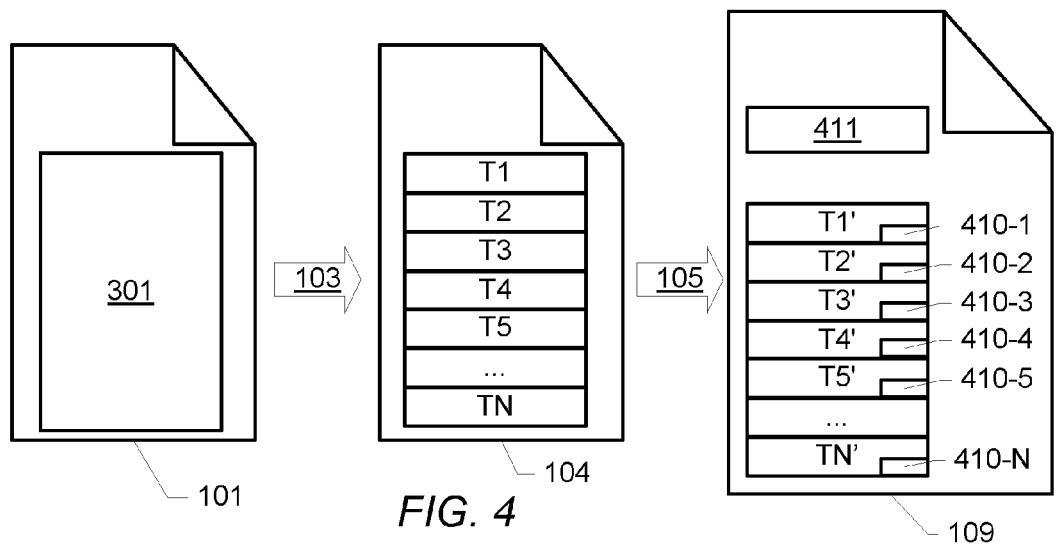
FIG. 4 schematically illustrates an example of a source code transformation resulting in a transformed source code including a distributed task selection and dispatch functionality.

Instead of performing the task selection and invocation by a separate function as described above, each task may compute its own successor, as illustrated in FIG. 4.

FIG. 4 shows an example of an input source code module 101, a corresponding source code module 104 in which a plurality of computational tasks, labelled T1, T2, . . . , TN have been identified e.g. by the code analysis module 103, and a transformed source code module 109, e.g. as generated by the transformation module 105. The transformed source code module includes transformed computational tasks T1', T2', . . . , TN', each of which includes additional one or more program statements 410-1, 410-2, . . . 410-N for selecting and invoking a successor task. The transformed source code module may further include an initialisation routine 411 for initialising the program state, e.g. including the random sequence, and for invoking an initial one of the transformed computational tasks.

For example, such a distributed task ordering may be achieved by integrating the evaluation of the functions κ and δt into the source code of each task using a source-to-source transformer, e.g. the code transformation module 105. The first task to execute is selected in the initialisation function 411 by applying κ to the initial state, that is:

$$t_1 = \kappa(s_0)$$

execute task $t_1$ and provide the state $s_0$ as a parameter

The transformation module transforms the source code corresponding to each task such that the task takes the current state s as an input parameter, updates the state s using $\delta_t$ and selects the next task t to execute using the function κ. The source code of each task is thus supplemented by source code 410-1, . . . , 410-N for performing the following steps after performing the normal computations of the task:

$$s' = \delta_t(s)$$

$$t' = \kappa(s')$$

execute task t' and provide the state s' as a parameter

It is noted that the update of the program state, e.g. the evaluation of δt in the above example, can be specialized in the context of a particular task t, i.e. different functions $\delta_t$ may be inserted into different tasks. In particular, the successors of a given task and the predecessors of those successors are known to the transformation module given a specific precedence graph. Consequently, the transformation module may generate specialised functions $\delta_t(s)$. The provision of specialised functions $S_t$ with respect to the task t allows a distribution the representation of the precedence graph.

As will now be described with reference to FIG. 5, the transformation module 105 or the code analysis module 103 may further duplicate the source code of one or more tasks. In this way, the process may generate multiple instances of the same task.

Figure 5:
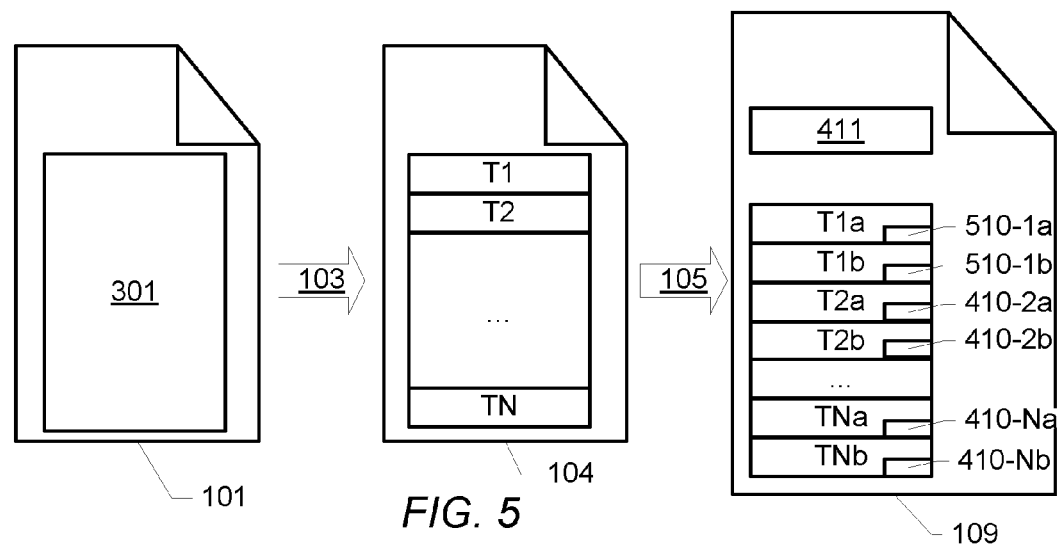
FIG. 5 schematically illustrates another example of a source code transformation resulting in a transformed source code including multiple instances of the computational tasks.

FIG. 5 schematically illustrates another example of a source code transformation resulting in a transformed source code including multiple instances of the computational tasks. In particular FIG. 5 shows an example of an input source code module 101, a corresponding source code module 104 in which a plurality of computational tasks, labelled T1, T2, . . . , TN have been identified e.g. by the code analysis module 103, and a transformed source code module 109, e.g. as generated by the transformation module 105. The transformed source code module is similar to the transformed source code module of FIG. 4, and it includes transformed computational tasks, each of which includes additional program statements for selecting and invoking a successor task. The transformed source code module further includes an initialisation routine 411 for initialising the program state, e.g. including the random sequence, and for invoking an initial one of the transformed computational tasks. In the example of FIG. 5, the transformation module 105 generates two instances of each identified computational task, such that each of the generated instances from a task performs the same computational task as the task from which it is generated. In particular, the transformation module 105 generates instances T1a and T1b from task T1, instances T2a and T2b from task T2, and instances TNa and TNb from task TN. Even though the example of FIG. 5 shows two instances for each computational task, it will be appreciated that the transformation module may generate a different number of instances, e.g. three, four, or even more instances. It will further be appreciated that the transformation module may generate different numbers of instances for different computational tasks and/or generate multiple instances only for a subset of computational tasks.

The transformation module may generate multiple instances simply by duplicating the source code of the original computational task. Additional diversity may be achieved when the transformation module applies different semantics-preserving transformations to one or more instances of a given task. As a result, not only the addresses vary, but also the instructions fetched from these addresses. Suitable examples of semantics-preserving transformations that may be used in this context are disclosed in e.g. "Compilers-Principles, Techniques and Tools" by Alfred V. Aho, Ravi Sethi and Jeffrey D. Ullman, Adison-Wesley, Reading, USA, 1986, or in "Watermarking, Tamper-proofing, and Obfuscation—Tools for Software Protection" by Christian S. Collberg and Clark Thomborson, IEEE Transactions on Software Engineering, 28:6 (June 2002.)

The transformation module may further represent each of the generated duplicate instances as respective nodes in the precedence graph to obtain a modified precedence graph. The inserted code for the selection of tasks thus selects one instance of each task (pseudo-) randomly in a particular execution of the software component. In this way, not only the order of execution, but also the memory addresses from which the code is executed vary between executions of the software component. In the example, the generated instances of the computational tasks are generated so as to include respective additional one or more program statements 510-1a, 510-1b, 510-2a, 510-2b, . . . , 510-Na, 510-Nb for selecting and invoking a successor task selected according to the modified precedence graph.

It will be appreciated that the generation of multiple instances of computational tasks may also be implemented in an embodiment with a central task selection and dispatch function.

Hence, in the above, different embodiments of a process for generating transformed program code have been described that result in an execution of the computational tasks in a randomised order, e.g. as defined by a (pseudo-) random sequence of numbers or other data items. As mentioned above, the pseudo-random sequence may be generated equal or different for different installations of the software component.

Typically, a pseudorandom number generator is initialised with an initial state—also referred to as a seed—as input. Thus, when the pseudo-random sequence is generated by a pseudorandom number generator (PRNG), different sequences of pseudo-random numbers may be generated by initialising the PRNG with a different seed in different installations of the software. For example, the seed may be derived from a serial number or another identifier that uniquely identifies an installation. Alternatively, the seed of the PRNG may be selected indicative of a predetermined group of installations, e.g. installations provided to a given customer, different language versions of a software component, or the like.

Hence, the initial state $s_0$ may include a pseudo-random seed, which is unique to a particular installation of the software component, but which does not vary between different executions of the same installation. Thus, using a deterministic pseudo-random number generator, results in an execution trace that is likely to be unique to the installation in the sense that the execution trace does not vary between different executions of the same installation given the same stimuli including e.g. the time at which the inputs such as network responses appear.

Alternatively, the initial state may be selected so as to be different (at least with a high likelihood) from execution to execution, e.g. by selecting the seed as a function of the date and time, a real-time clock, and/or other varying information. In some embodiments, the randomised sequence may be generated by a hardware random number generator, so that each execution of the same installation is likely to result in a different trace.

Hence in one embodiment of the process described herein, the code generation process

- integrates the code for the ordering of the computational tasks within the computational tasks themselves, and the state update is specialized with respect to each task,
- generates several instances of each of at least a subset of tasks and applies different semantics-preserving transformations to each instance,
- generates code that causes the execution trace to be fixed for a particular installation of the software component, but to differ between different installations.

Using multiple instances of critical code, integrating the selection functions in the original tasks and applying semantics-preserving transformations to the instances result in additional diversity, which further complicates analysis.

Figure 6:
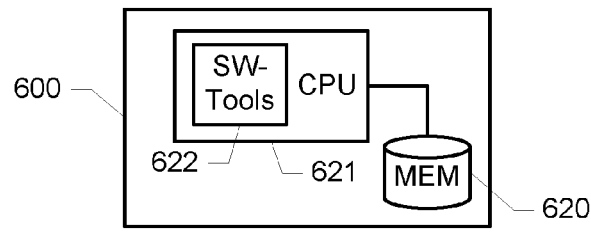
FIG. 6 shows a schematic block diagram of a system for tamper-protecting program code.

FIG. 6 shows a schematic block diagram of a system for tamper-protecting program code. The system comprises a data processing system 600, e.g. a computer such as a PC. The data processing system includes a processing unit 621, e.g. a microprocessor such as a CPU of a computer. The processing unit 621 is connected to a storage device 620, such as a hard disk, a memory card interface, an optical disk device, or the like. The processing unit 621 is suitably programmed to execute an automated software tool 622, such as a source-to-source transformer. For example, the automated software tool 622 may be adapted to cause the processing unit 621 to load the input representation, e.g. the source code, of the program code from the storage device 620, and to perform the steps of the method described herein. The processing unit 621 may then store the transformed source code on the storage device 620. Alternatively, the processing unit may make the transformed source code available to other programs executed on the data processing systems, e.g. a compiler, and/or output the result via another suitable interface. In yet an alternative embodiment, the automated software tool may process, e.g. compile, the transformed source code directly.

Although some embodiments have been described and shown in detail, the invention is not restricted to them, but may also be embodied in other ways within the scope of the subject matter defined in the following claims.

The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A computer-implemented method of generating tamper-protected computer program code, the method comprising:
    obtaining a representation of the computer program code, the computer program code being adapted to cause a data processing system to perform a plurality of computational tasks in a first order of execution that results in a known functionality, each computational task being represented in the representation of the computer program code by at least one program statement;
    obtaining a plurality of alternative orders of execution of the computational tasks, wherein each one of the alternative orders of execution of the computational tasks results in the known functionality;
    generating an executable representation of the program code adapted to cause a data processing system to select a randomized order of execution from the plurality of alternative orders of execution and to execute the computational tasks in the selected randomized order of execution;
    wherein generating an executable representation of the program code comprises including computer-executable instructions in the executable representation of the program code, the computer-executable instructions being adapted to cause a data processing system to perform the following tasks, when the program code image is executed by the data processing system:
a) performing an initial one of the computational tasks;
b) selecting a subsequent computational task from a set of alternative successors of the performed computational task based on a representation of a set of precedence constraints imposed on the order of execution of the computational tasks;
c) performing the selected computational task; and
d) repeating steps b) and c) until all computational tasks have been performed, thereby achieving the known functionality.

2. A method according to claim 1, wherein each of the alternative orders of execution is adapted to cause the data processing system to produce the same program output as the first order of execution, when said program code is executed by said data processing system.

3. A method according to claim 1, further comprising representing the alternative orders of execution as a precedence graph.

4. A method according to claim 1, comprising:
receiving an input representation indicative of a plurality of program statements in a predetermined sequential order;
grouping the program statements to obtain the plurality of computational tasks; and
identifying the plurality of alternative orders of execution.

5. A method according to claim 1,
wherein the representation of a set of precedence constraints includes a representation of a precedence graph; and
wherein generating an executable representation of the program code further comprises including computer-executable instructions in the executable representation of the computer program adapted to cause a data processing system to maintain an execution state, the execution state being defined by at least one of the subset of computational tasks that remain to be executed and the subset of computational tasks that remain to be executed and whose predecessors in the precedence graph have all been executed.

6. A method according to claim 5, wherein a representation of the execution state further includes a seed data item for initialising a function for generating a randomized sequence of data items.

7. A method according to claim 6, comprising generating respective executable representations of the program code for different installations of the program code, each executable representation of the program code including a respective seed data item indicative of the corresponding installation.

8. A method according to claim 1, further comprising inserting executable instructions into each of the computational tasks for performing the step of selecting the subsequent computational task.

9. A method according to claim 1, further comprising generating executable instructions of multiple instances of the computational task; and wherein selecting a computational task includes selecting one of the multiple instances of the computational tasks.

10. A method according to claim 9, further comprising performing one or more obfuscating transformations on at least one of the multiple instances.

11. A method according to claim 1, wherein generating an executable representation of the program code comprises generating an executable representation of the program code including program code for causing a data processing system to select the same randomized order of execution from the plurality of alternative orders of execution during each execution of the generated executable representation of the program code.

12. A method according to claim 1, comprising generating a plurality of executable representations of the program code, each including program code for causing a data processing system to select a different randomized order of execution.

13. A method according to claim 1, wherein the input representation of the program code includes at least one input source code module.

14. A method according to claim 1, comprising generating at least one transformed source code module.

15. A data processing system comprising:
processing hardware configured to perform the steps of a method of generating tamper-protected computer program code, wherein the method comprises:
obtaining a representation of the computer program code, the computer program code being adapted to cause a data processing system to perform a plurality of computational tasks in a first order of execution that results in a known functionality, each computational task being represented in the representation of the computer program code by at least one program statement;
obtaining a plurality of alternative orders of execution of the computational tasks, wherein each one of the alternative orders of execution of the computational tasks results in the known functionality;
generating an executable representation of the program code adapted to cause a data processing system to select a randomized order of execution from the plurality of alternative orders of execution and to execute the computational tasks in the selected randomized order of execution;
wherein generating an executable representation of the program code further comprises including computer-executable instructions in the executable representation of the program code, the computer-executable instructions being adapted to cause a data processing system to perform the following tasks, when the program code image is executed by the data processing system:
a) performing an initial one of the computational tasks;
b) selecting a subsequent computational task from a set of alternative successors of the performed computational task based on a representation of a set of precedence constraints imposed on the order of execution of the computational tasks;
c) performing the selected computational task; and
d) repeating steps b) and c) until all computational tasks have been performed, thereby achieving the known functionality.

16. A computer program product comprising computer-executable program code means stored on a non-transitory computer-readable storage medium, wherein the computer-executable program code means are adapted to cause a data processing system to perform a method of generating tamper-protected computer program code, when the program code means are executed by the data processing system, wherein the method comprises:
obtaining a representation of the computer program code, the computer program code being adapted to cause a data processing system to perform a plurality of computational tasks in a first order of execution that results in a known functionality, each computational task being represented in the representation of the computer program code by at least one program statement;
obtaining a plurality of alternative orders of execution of the computational tasks, wherein each one of the alternative orders of execution of the computational tasks results in the known functionality;

generating an executable representation of the program code adapted to cause a data processing system to select a randomized order of execution from the plurality of alternative orders of execution and to execute the computational tasks in the selected randomized order of execution;

wherein generating an executable representation of the program code further comprises including computer-executable instructions in the executable representation of the program code, the computer-executable instructions being adapted to cause a data processing system to perform the following tasks, when the program code image is executed by the data processing system:

a) performing an initial one of the computational tasks;
b) selecting a subsequent computational task from a set of alternative successors of the performed computational task based on a representation of a set of precedence constraints imposed on the order of execution of the computational tasks;
c) performing the selected computational task; and
d) repeating steps b) and c) until all computational tasks have been performed, thereby achieving the known functionality.

17. A computer program product according to claim 16, wherein the computer program product comprises a software compiler comprising functionality adapted to cause the data processing system to perform the method as one of a number of compilation passes performed by the software compiler.

* * * * *

UNITED STATES PATENT AND TRADEMARK OFFICE
CERTIFICATE OF CORRECTION

PATENT NO. : 8,522,047 B2
APPLICATION NO. : 12/664893
DATED : August 27, 2013
INVENTOR(S) : Eker et al.

It is certified that error appears in the above-identified patent and that said Letters Patent is hereby corrected as shown below:

In the Claims

In Column 18, Line 35, in Claim 15, delete "further comprises" and insert -- comprises --, therefor.

In Column 19, Line 10, in Claim 16, delete "further comprises" and insert -- comprises --, therefor.

Signed and Sealed this
Twenty-fifth Day of March, 2014

Michelle K. Lee
*Deputy Director of the United States Patent and Trademark Office*